United States Patent Office 3,490,933
Patented Jan. 20, 1970

3,490,933
GROUTING COMPOSITION
Lloyd E. Van Blaricom and Harvey R. Deweyert, Shelton, Wash., and Norman H. Smith, Crockett, Calif., assignors to ITT Rayonier Incorporated, New York, N.Y., a corporation of Delaware
No Drawing. Filed July 12, 1967, Ser. No. 652,703
Int. Cl. C04b 19/02
U.S. Cl. 106—287    4 Claims

ABSTRACT OF THE DISCLOSURE

The aqueous gel-forming grouting composition of this invention contains (a) a sulfonated polyphenolic material extracted from a coniferous tree bark or from quebracho wood, (b) a water soluble dichromate compound, and (c) borax. This aqueous grouting composition, at a pH between about 8–10.5, is admixed with particulate solid material such as earth, sand, and gravel. The grouting composition thereupon gels in situ and consolidates the particulate solid material into a permanently grouted structure.

BACKGROUND OF THE INVENTION

Field of the invention

This invention relates to the chemical grouting of porous formations of particulate solids such as earth, sand, and gravel in order to stabilize, strengthen, and immobilize the same.

Description of prior art

The grouting of porous formations such as earth, sand, gravel, and certain waste solids with gel or solid forming liquids in order to stabilize said formations is of interest to a wide variety of industries. For example, earth grouting is used to facilitate tunnelling, ditching, and mining operations, to stop water and gas flows into and around basements, ditches, pipelines, dams, tunnels, mines, oil wells, etc., and to improve the load-bearing capacity of earthen formations for the erection of buildings, and the construction of roads, airstrips, etc. As would be expected, the optimum characteristics desired in the grouting solutions and the grouted formations vary also almost as widely as the uses to which they are put.

One use for grouting of particular interest to the construction and mining industries lies in the temporary solidification of loose (or quick) sandy or waterbearing earthen formations to facilitate tunnelling and ditching operations therein. For this purpose the grouting solution should advantageously have as low a viscosity as possible and an accurately controllable gel time ranging from a few seconds to an hour or more to facilitate penetration and accurate placement of the grout in the formation.. Preferably, it should also be impervious over a fairly wide range to changes in composition of the strata and pH. Once in place, the grout should ideally gel to form a grouted structure of substantial strength in a minimum of time in order to reduce the time required for tunnelling and ditching operations to a minimum. Tunnelling being done in an enclosed area, the grouting system is ordinarily free of all toxic and objectionable odors. Finally, in order for the grouted structure to be easily mined and worked, it is desirable that the structure be of substantial strength, but not as hard as concrete or rock. While the grouting system of the present invention is of general interest in the grouting field, it is of particular utility and interest for the foregoing purposes.

Initially all grouting was done with cement-water slurries, with or without added accelerators, retarders, sand, etc. For many purposes, such as that described in the preceding paragraph, however, cement slurries are not satisfactory. Placement is difficult, if not impossible. They are sensitive to composition and pH of the formation. Solidification is slow, and, when it does take place, the grouted formation tends to be too hard, etc. As a result, pressure-grouting systems based on polymeric organic gels such as those formed by catalytically chrome gelling lignosulfonates were developed. Perhaps the most typical of these is described in United States Patent No. 2,874,545, issued Feb. 24, 1959, to Robert Hubert Twining. This chrome-gelled lignosulfonate system represents an improvement over cement slurries where the grouted material is to be mined or removed from the formation. The Twining system is not considered entirely satisfactory, however. For example, when using effective concentrations of the gelling agent, the viscosity tends to be high, thereby interfering with adequate penetration and accurate placement. The grout is sensitive to pH and must be kept on the acid side even in alkaline formations. Finally, gel time is difficult to control accurately and gel strength builds up relatively slowly causing costly delays.

The present grouting system is designed to overcome the foregoing difficulties. It has a minimum viscosity almost as low as water for accurate penetration and placement. It is relatively insensitive to changes in environment and pH being operable over a range from about 8 to 10.5 with the preferred range being about 8.0 to 9.5. The gel time is accurately and readily controllable over a range of a few seconds to an hour or more. Finally, it builds up grouted gel strength very rapidly, eliminating unnecessary delays in tunnelling and ditching operations and it gives off no objectionable or toxic fumes.

SUMMARY OF THE INVENTION

The grouting composition of this invention comprises an aqueous solution, having a pH between about 8–10.5, containing (a) about 25–45% by weight of a sulfonated polyphenolic material extracted from coniferous tree bark or from quebracho wood, or a mixture thereof, (b) about 5–40% of a water soluble dichromate compound, based on the weight of the sulfonated polyphenolic material, and (c) about 5 to 25% borax, based on the weight of the sulfonated polyphenolic material. When grouting (depending upon the conditions and results desired), suitable proportions of solutions of the above materials are mixed together and immediately injected into or admixed with the formation to be grouted where, at the previously determined gel time, the dichromate causes the polyphenolic material to gel in situ with the borax assisting in controlling the gel time. The borax also assists the grouting composition to consolidate with the particulate material increasing the strength especially when forming a relatively permanently grouted structure. In this manner the present invention provides a novel grouting composition which is of substantial strength, but not as hard as concrete or rock, and which is relatively inexpensive to use, is controllable over a wide range of solidification times ranging from a second or two to several hours after injection, is relatively non-toxic, non-corrosive, non-viscous, and odorless, and provides grouted structures that are extremely strong, stable, water-resistant and capable of accurate placement.

DESCRIPTION OF THE PREFERRED EMBODIMENTS

The sulfonated polyphenolic material employed in accordance with this invention is prepared by digesting a coniferous bark such as from one or more of the following trees: western hemlock, Douglas fir, Amabilis fir, Sitka spruce, and southern yellow pine (*Pinus eschinata, taeda, caribaea, elliotti,* and *rigida* var. *serotina*) with a salt of sulfurous acid such as sodium sulfite or with a mixture of sodium sulfite and sodium bisulfite advantageously by the method described in the Van Blaricom et al. United States Patent No. 2,831,022. Aqueous extracts of quebracho wood such as those used in the well-drilling industry can be sulfonated in a similar manner and employed herein. The resulting sulfonated polyphenolic material is advantageously made neutral or slightly alkaline by adding to a solution thereof a caustic agent such as sodium hydroxide.

In a typical operation, the ground bark is digested in a closed vessel with sodium sulfite (or with a mixture of sodium sulfite and sodium bisulfite) at a consistency of approximately 19% and a pH of 5.85. The amount of digesting chemical is equivalent to a ratio of $SO_2$ to dry bark of 0.07. The digestion is carried out for 30 minutes at 170° C. The resulting aqueous extract is then drained off, the bark pressed, and the combined drainings and pressings allowed to settle to remove sludge. The extract is then neutralized to pH 8.0 with NaOH solution, evaporated to approximately 45% total solids, and spray dried. For a typical operation using sulfonated quebracho wood extract, a commercial grade of unsulfonated quebracho extract of the type used in oil well drilling operations is dissolved in cold water to make up a 35% solution by weight. To this solution is added sufficient sodium sulfite to be equivalent to 14% $SO_2$ based on the weight of the quebracho wood extract solids. The mixture is then heated to about 150° C. for about 30 minutes in order to sulfite quebracho extract after which it is neutralized to pH 8.0 with NaOH solution, evaporated and spray dried in a similar manner to the foregoing bark extract.

Coniferous tree barks and quebracho wood are known to contain substantial amounts of polymeric flavonoid materials that are copolymers of polyhydroxy flavon-3-ols and polyhydroxy flavon-3,4-diols. These condensed tannin-like polymers, while otherwise quite similar in characteristics, range from low-molecular weight, water-soluble tannins through alcohol-soluble phlobaphenes to high-molecular weight phenolic acids that are not soluble in neutral solvents. These materials, when sulfonated, are useful in this invention.

The grouting composition is formed by adding a sufficient amount of dichromate to form a strong gel (i.e., a gel sufficient to consolidate a mass of particulate solids into a strong, stable, water-resistant solid grouted structure). The effect of the several process variables on the rate of gelation, the time at which gelation will occur, and the strength of the gels formed are interrelated. The higher the concentration of either the sulfonated polyphenolic material or the dichromate gelling agent in the grouting solution, the quicker it starts to gel and the faster the gel develops strength. Borax is included in the grouting composition to retard the time in which the gel begins to form. The proportion of each constituent can, of course, vary widely as recognized by those skilled in the art. The preferred ratios of these chemicals, however, for most purposes have been found to lie within the range of about 25 to 45% sulfonated polyphenolic material and from about 5 to 40% sodium dichromate based on the weight of the sulfonated polyphenolic material. Borax slows down and provides control of the rate of reaction between the sulfonated polyphenolic material and the dichromate which otherwise is too fast for practical purposes. For the purposes of this invention, a water soluble chromate, such as sodium chromate, may be used in place of, or along with, the water soluble dichromate. Depending upon the concentration of the sulfonated polyphenolic material and dichromate (or chromate), the addition of from about 5 to 25% borax based on the weight of the sulfonated polyphenolic material provides satisfactory control of the gelation time without adverse effect on the gel strengths. A pH range of about 8 to 10.5 is advantageously used, with about 8 to 9.5 being preferred. Although rising temperatures speed up the rate of gelation, there is still sufficient latitude in the grouting system to control gelation at any ambient temperatures ordinarily encountered in grouting operations.

The process of the invention can advantageousdy be carried out by mixing together suitable proportions of (a) an aqueous solution containing the sulfonated polyphenolic material and (b) an aqueous solution containing the soluble dichromate (e.g. a chromate and/or a dichromate) and borax by using a mixing valve and immediately injecting said mixture into the porous solids to be grouted. In grouting earthen formations, for example, pipes are inserted therein and the mixture is pumped therethrough under pressure into said formation. The pipes are slowly withdrawn from the earth as the grout diffuses out from the holes left by the pipes. The most desirable proportions of these materials to employ can readily be determined by those skilled in the art.

The following examples are illustrative of the grouting compositions of the invention:

*Example I.*—A 35% solution by weight was made up of a sulfonated polyphenolic material extracted from western hemlock bark prepared by a process as described above. 100 grams of this solution were used for each test, and varying quantities of 50% sodium dichromate solutions were added, as well as varying quantities of borax. The gelation time was determined as the time when the mixture would no longer flow. Strength tests were made with a penetrometer. The following results illustrate the build-up of strength with time, the effect of increasing amounts of dichromate, and the moderating effect of borax on the gelation time.

TABLE I.—NO BORAX ADDED, pH 8

| Time | Ml. 50% $Na_2Cr_2O_7$ added | Gelation time, seconds | Penetrometer reading, p.s.i. |
|---|---|---|---|
| 15 minutes | 4.1 | 85 | 96 |
| 30 minutes | 4.1 | 85 | 130 |
| 60 minutes | 4.1 | 85 | 125 |
| 4 hours | 4.1 | 85 | 175 |
| 24 hours | 4.1 | 85 | 265 |
| 48 hours | 4.1 | 85 | 240 |
| 15 minutes | 5.85 | 34 | 200 |
| 30 minutes | 5.85 | 34 | 260 |
| 60 minutes | 5.85 | 34 | 260 |
| 4 hours | 5.85 | 34 | 315 |
| 24 hours | 5.85 | 34 | 380 |
| 48 hours | 5.85 | 34 | 355 |
| 15 minutes | 11.65 | 8 | 355 |
| 30 minutes | 11.65 | 8 | 390 |
| 60 minutes | 11.65 | 8 | 470 |
| 4 hours | 11.65 | 8 | 600 |
| 24 hours | 11.65 | 8 | 700 |
| 48 hours | 11.65 | 8 | 660 |

TABLE II.—3 g. BORAX ADDED/100 g. SULFONATED POLYPHENOLIC SOLUTION

| Time | Ml. 50% $Na_2Cr_2O_7$ added | Gelation time, seconds | Penetrometer reading, p.s.i. |
|---|---|---|---|
| 15 minutes | 4.1 | 173 | 60 |
| 30 minutes | 4.1 | 173 | 74 |
| 60 minutes | 4.1 | 173 | 94 |
| 4 hours | 4.1 | 173 | 160 |
| 24 hours | 4.1 | 173 | 180 |
| 48 minutes | 4.1 | 173 | 180 |
| 15 minutes | 5.85 | 74 | 140 |
| 30 minutes | 5.85 | 74 | 165 |
| 60 minutes | 5.85 | 74 | 220 |
| 4 hours | 5.85 | 74 | 270 |
| 24 minutes | 5.85 | 74 | 330 |
| 48 hours | 5.85 | 74 | 365 |
| 15 minutes | 11.65 | 19 | 340 |
| 30 minutes | 11.65 | 19 | 370 |
| 60 minutes | 11.65 | 19 | 450 |
| 4 hours | 11.65 | 19 | 640 |
| 24 hours | 11.65 | 19 | 670 |
| 48 hours | 11.65 | 19 | 800 |

TABLE III.—7.5 g. BORAX/100 g. SULFONATED POLYPHENOLIC SOLUTION

| Time | Ml. 50% $Na_2Cr_2O_7$ added | Gelation time, seconds | Penetrometer reading, p.s.i. |
|---|---|---|---|
| 15 minutes | 4.1 | 1,874 | 20 |
| 30 minutes | 4.1 | 1,874 | 34 |
| 60 minutes | 4.1 | 1,874 | 40 |
| 4 hours | 4.1 | 1,874 | 76 |
| 24 hours | 4.1 | 1,874 | 110 |
| 48 hours | 4.1 | 1,874 | 110 |
| 15 minutes | 5.85 | 725 | 32 |
| 30 minutes | 5.85 | 725 | 64 |
| 60 minutes | 5.85 | 725 | 90 |
| 4 hours | 5.85 | 725 | 160 |
| 24 hours | 5.85 | 725 | 250 |
| 48 hours | 5.85 | 725 | 260 |
| 15 minutes | 11.65 | 90 | 200 |
| 30 minutes | 11.65 | 90 | 280 |
| 60 minutes | 11.65 | 90 | 320 |
| 4 hours | 11.65 | 90 | 475 |
| 24 hours | 11.65 | 90 | 720 |
| 48 hours | 11.65 | 90 | 745 |

*Example II.*—This example illustrates the effect of variation of the concentration of the sulfonated polyphenolic material and the strengths obtained when the gels are filled with sand. In all cases 24-hour strengths are given.

TABLE IV.—SAMPLE MIX

Sulfonated polyphenolic solution _____g___ 50
Borax _____g___ 2.5
Sand (8–16 mesh) _____g___ 150
50% $Na_2Cr_2O_7$ solution _____ml___ 4

| Concentrated sulfonated polyphenolic solution: | Penetrometer test. p.s.i. |
|---|---|
| 35% | 4080 |
| 30% | 2800 |
| 25% | 1740 |

*Example III.*—It was desired to run a sewer line under a freeway near Baltimore, Md. The freeway was built on a filled area which was heavily watered and composed of clay, sand, and muck. When the excavation was started, it soon became evident that the bank was caving in and that the formation behind the bulkhead was very "quick."

A grouting solution was then made up employing the chemical grouting composition of this invention. In one solution, 500 pounds of a sulfonated polyphenolic material was dissolved in 100 gallons of water and the solution made up to a total of 250 gallons. In the other solution, 150 pounds of sodium dichromate dihydrate and 25 pounds of borax were dissolved in water and made up to 250 gallons.

These solutions were pumped through a mixing T at a ratio of six volumes of sulfonated polyphenolic solution to one of dichromate-borax solution, and thence through pipes driven into the formation. After sufficient time to allow the gel to form and set, the bulkheading was removed. The water flows had all stopped and there was no caving. After standing over a weekend, there was still no caving or water flows.

*Example IV.*—Samples of ground bark from western hemlock, Douglas fir, amabilis fir, Sitka spruce and southern yellow pine were digested in a closed vessel with an aqueous solution of sodium sulfite and bisulfite (about 0.0175 and 0.0525 $SO_2$:bark, respectively) for 25 minutes at 170° C. In a similar manner a sample of ground redwood bark was digested with an aqueous solution of sodium sulfite alone (about 0.07 $SO_2$:bark for 30 minutes at 150° C. Finally a sample of commercial extract of quebracho wood was sulfonated by digestion with an aqueous solution of sodium sulfite (about 0.055 $SO_2$: quebracho extract for 30 minutes at 150° C. Each of the aqueous sulfonated polyphenolic extract solutions was then screened through a 325-mesh screen and concentrated to about 45% total solids content by evaporation, alkalized to a pH of 8.5 with NaOH solution and spray dried.

For testing purposes the foregoing powdered polyphenolic materials were each dissolved in water and sufficient borax added to make said solution 30% in the sulfonated polyphenolic and 16% borax on weight of said polyphenolic. The pH of each solution was then adjusted to 9.0. 100-ml. samples were gelled by the addition of either 25 or 50 ml. of a 20% solution of $$Na_2CR_2O_7 \cdot 2H_2O$$

at ambient temperatures and gel strengths determined with a penetrometer at intervals of 15, 60, 240 and 2880 minutes and recorded in the following table:

TABLE V

| Source of sulfonated polyphenolic material | Ml·20% $Na_2Cr_2O_7·H_2O$ added | Gelation time, minutes: seconds | Gel strengths, p.s.i., time in minutes | | | |
|---|---|---|---|---|---|---|
| | | | 15 | 60 | 240 | 2,880 |
| Hemlock bark | 25 | 17:35 | | 30 | 78 | 158 |
| Do | 50 | 2:10 | 32 | 49 | 90 | 120 |
| Douglas fir bark | 25 | 45: | | 7 | 36 | 128 |
| Do | 50 | 4:28 | 13 | 41 | 66 | 106 |
| Amabilis fir bark | 25 | 31:15 | | 15 | 48 | 122 |
| Do | 50 | 3:40 | 20 | 45 | 61 | 97 |
| Spruce bark | 25 | 30: | | 22 | 70 | 160 |
| Do | 50 | 3:40 | 25 | 54 | 72 | 102 |
| Southern pine bark | 25 | 20: | | 22 | 71 | 150 |
| Do | 50 | 3:50 | 28 | 53 | 76 | 117 |
| Redwood bark | 25 | 1:35 | 49 | 100 | 158 | 204 |
| Do | 50 | 0:12 | 81 | 123 | 156 | 176 |
| Quebracho wood | 25 | 1:30 | 141 | 272 | 348 | 364 |
| Do | 50 | :30 | 129 | 274 | 280 | 320 |

We claim:

1. An aqueous gel-forming grouting composition which consists essentially of an aqueous solution containing (a) about 25 to about 45% by weight of a sulfonated derivative of substantially non-methoxylated polymeric phenolic materials occurring in a member of the group consisting of coniferous tree bark and quebracho wood, and (b) about 5 to 40% of a water soluble dichromate based on the weight of the sulfonated polyphenolic material, and (c) from about 5 to 25% of borax based on the weight of the sulfonated polyphenolic material, said gel-forming grouting composition having a pH between about 8–10.5.

2. The aqueous gel-forming grouting composition of claim 1 wherein the pH is between about 8–9.5.

3. The improved process for producing a grouted structure which comprises distributing in a mass of solid particulate material selected from the group consisting of earth, sand, gravel and clay, an aqueous gel-forming grouting composition, said aqueous gel-forming grouting composition having a pH of from about 8–10.5 consisting essentially of and containing (a) about 25 to about 45% by weight of a sulfonated derivative of substantially non-methoxylated polymeric phenolic material occurring in a member of the group consisting of coniferous bark and quebracho wood, (b) about 5 to 40%, based on the weight of the sulfonated polyphenolic material, of a water soluble dichromate to form a strong gel with said sulfonated polyphenolic material, and (c) about 5 to 25%, based on the weight of the sulfonated polyphenolic material, of borax to control the gel time.

4. The process of claim 3 in which the particulate material is earth.

References Cited

UNITED STATES PATENTS

| | | | |
|---|---|---|---|
| 3,214,373 | 10/1965 | Adolphson | 252—8.5 |
| 2,999,108 | 9/1961 | Gray et al. | 252—8.5 |
| 2,874,545 | 2/1959 | Twining | 61—36 |
| 2,831,022 | 4/1958 | Van Blaricom | 260—512 |

JULIUS FROME, Primary Examiner

T. MORRIS, Assistant Examiner

U.S. Cl. X.R.

61—36